United States Patent [19]

Riddle

[11] 4,360,829
[45] Nov. 23, 1982

[54] ACTIVE DISTORTION ELIMINATION CIRCUITRY FOR A VIDEO DISC PLAYER

[75] Inventor: George H. N. Riddle, Princeton, N.J.

[73] Assignee: RCA Corporation, New York, N.Y.

[21] Appl. No.: 162,593

[22] Filed: Jun. 24, 1980

[51] Int. Cl.³ .......................... H04N 5/76; H04N 5/21
[52] U.S. Cl. .................................. 358/340; 358/167; 358/342
[58] Field of Search ................. 358/128.6, 128.5, 36, 358/167; 360/33

[56] References Cited

U.S. PATENT DOCUMENTS

| | | | |
|---|---|---|---|
| 3,132,339 | 5/1964 | Boughnou | 343/8 |
| 3,548,326 | 12/1970 | Bilotti | 329/1 |
| 3,934,263 | 1/1976 | Palmer | 358/4 |
| 3,988,531 | 10/1976 | Laub | 358/128.5 |
| 4,166,251 | 8/1979 | Ishigaki et al. | 329/132 |
| 4,247,866 | 6/1981 | Wilber et al. | 358/128.6 X |
| 4,272,786 | 6/1981 | Gibson | 358/128.5 |
| 4,286,282 | 8/1981 | Christopher et al. | 358/128.6 X |

*Primary Examiner*—Aristotelis M. Psitos
*Attorney, Agent, or Firm*—E. M. Whitacre; J. S. Tripoli; E. P. Herrmann

[57] ABSTRACT

In a video disc system, the picture display is adversely affected by intermodulation distortion occuring in the signals recovered from the disc record. A non-linear circuit, responsive to a bias signal, generates a compensation signal in a diode modulator for cancelling the undesired distortion components of the recovered signal. The resulting distortion after cancellation is measured in a comparator circuit to determine if the distortion has increased or decreased. The comparator circuitry outputs an appropriate signal to bias the non-linear circuit to further reduce the distortion components. A small oscillation is superimposed on this bias signal, which oscillation simplifies the comparator circuitry and forces the circuit to search for an optimum operating point.

16 Claims, 6 Drawing Figures

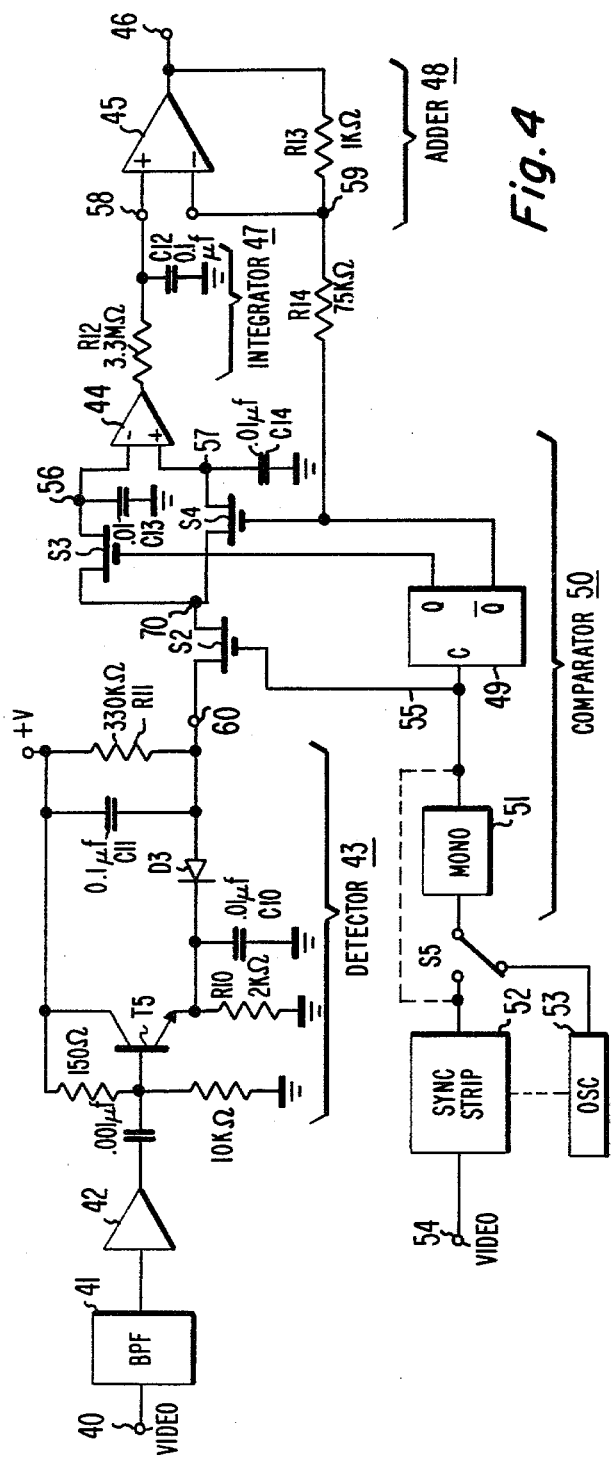
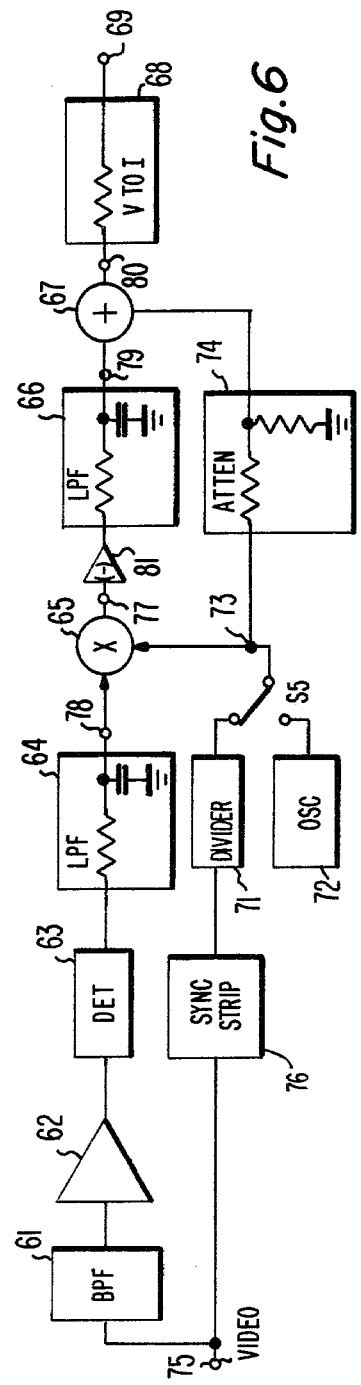
Fig. 4
Fig. 6

ACTIVE DISTORTION ELIMINATION CIRCUITRY FOR A VIDEO DISC PLAYER

This invention relates generally to apparatus for reproducing information from a record medium, and more particularly to non-linear systems incorporated in a reproducing apparatus for reducing intermodulation distortion occurring between video and audio information recovered from a disc record.

Certain video disc playback systems incorporate disc records wherein the recorded information occurs as geometric variations imposed upon information tracks or grooves on the surface of a disc record. The disc, or at least a layer of the disc proximate its surface is conductive. A signal pickup stylus comprising a dielectric support element having a conductive electrode adherent to one of its faces engages the information track so that a measurable capacitance is formed between the conductive disc and the stylus electrode. Causing relative translation along the track between the pickup stylus and disc record produces a temporally varying capacitance in accordance with the geometric variations in the track. The varying capacitance is made part of a tuned circuit for modulating the resonant frequency of such circuit, permitting the detection of extremely small capacitance differences. A signal having a constant frequency near the nominal resonant frequency of the tuned circuit is applied across the tuned circuit, the amplitude of which is modulated by the changes in resonant frequency. The amplitude of this constant frequency signal is then detected to produce an electrical manifestation of the recorded information.

For video applications, the signal recorded on the disc record typically contains the linear sum of a high frequency picture carrier, frequency modulated by a composite signal formed from a baseband video signal and a phase modulated chroma carrier, and, at least one lower frequency sound carrier, frequency modulated by a baseband audio signal. It has been observed that on recovery of signals in this format from the disc record, a distortion occurs which is manifested as the intermodulation products of the sound and picture carriers ultimately resulting in disturbing visual beats in the reproduced image displayed on a television receiver. The cause of the intermodulation distortion is believed to be the asymmetric shape of the stylus dielectric support element with respect to the stylus conductive electrode, which asymmetry is imposed by manufacturing constraints. Apparently the stylus dielectric skews the effective cross section of the disc record which the stylus electrode "sees" as it translates along the information track. For a more comprehensive explanation see U.S. Pat. No. 3,934,263 issued Jan. 20, 1976 to R. C. Palmer entitled "Video Disc Recording Apparatus and Methods," assigned to the common assignee with the present invention.

The distortion or visual beats can be reduced by generating further intermodulation products which are complementary (in phase) to the distortion signals, and linearly summing the generated signal which modulated the picture carrier to effect a cancellation of the undesired distortion signals. The generation of the cancellation signals is performed by passing the recovered signal, comprising the sound and picture carriers, through a non-linear aperture corrector, or NLAC, including non-linear circuit elements arranged to form a product modulator. The performance of such circuitry is dependent upon the amount of bias current or bias voltage applied to the non-linear circuit elements, permitting regulation of the amplitude of the cancellation signal by varying the bias parameters.

In accordance with the present invention a circuit means is provided for sampling the undesired intermodulation signal occurring in the corrected or compensated baseband signal and generating an appropriate bias parameter for conditioning the non-linear circuitry to further reduce the undesired distortion.

The baseband video signal is filtered to extract the distortion components of the signal. The distortion signal is amplitude detected and applied to a processing circuit which samples the signal at regular intervals and compares the amplitude of successive samples. The processing circuit produces a first output potential when successive signal samples decline in amplitude and a second output potential when successive signal samples increase in amplitude. The output potential is integrated and summed with a further signal which alternately increments and decrements the integrated potential by a small potential, in synchronism with the sampling periods. This dithering integrated potential is converted to a current and applied to bias the non-linear correction circuit. By dithering the bias of the NLAC circuit, and causing the bias to shift in the direction of dither which tends to reduce distortion, the bias maintains system operation relatively near its optimum operating point for elimination of distortion.

In the drawings:

FIGS. 4 and 6 are schematic diagrams of alternate circuits for generating bias current for the non-linear correction circuitry.

Figure 1:
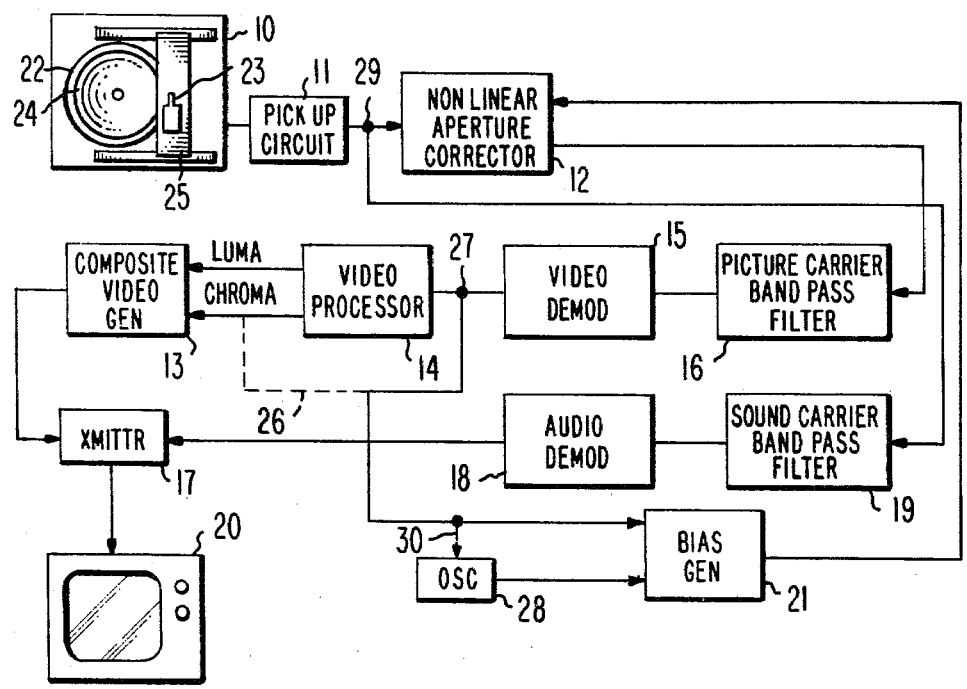
FIG. 1 is a block diagram of a video disc player system incorporating an adaptive distortion-elimination apparatus.

Referring to FIG. 1, a video disc player 10 has a turntable 22 for rotatably supporting a disc record 24 having information tracks thereon containing composite picture and sound components of a video signal. The player includes a signal pickup cartridge 23 removably mounted in a carriage assembly 25 which is subject to radial translation across the disc record in correlation with the rotation of the turntable. The cartridge 23 houses a signal pickup stylus which engages the disc record and cooperates with the pickup circuitry 11 to recover the prerecorded information from the disc record. The recovered signal, which is the composite sum of a picture FM carrier, a sound FM carrier and the aforementioned undesired intermodulation products, is available as an electrical output signal from the pickup circuitry 11 and is applied to the NLAC circuit 12.

The NLAC circuit 12 cooperating with the bias generator 21 operates to reduce the visual beat appearing in the displayed picture. The output signal from the NLAC circuit is filtered by circuit 16 to extract the FM picture carrier which is demodulated to baseband video by circuit 15, undergoes chrominance and luminance signal separation in circuit 14 and is reformatted to a standard TV signal format, such as NTSC in the composite video generator 13. The demodulated video signal at circuit node 27 is applied to the bias generator 21 which selectively extracts the distortion component of the video signal and successively samples the amplitude of the distortion component. Depending on the distortion component decreasing or increasing in amplitude, bias generator 21 applies an appropriate increasing or decreasing bias current to the NLAC circuit 12 to further reduce the distortion component.

The oscillator 28 generates signals to control the sampling function performed by the bias generator circuitry and supplies a signal which alternately increments and decrements the bias generator output signal by a small amount. Dithering the bias current to the NLAC circuit by incrementing and decrementing the bias generator output causes the correction-feedback loop to constantly search for the optimum operating point.

Depending upon the particular circuit configuration of the bias generator 21, it may be advantageous to sample the distortion component of the video signal synchronously with the baseband video signal, e.g., synchronously with the video field rate. In this event the oscillator 28 would be connected to receive the baseband video (via connection 30) and generate pulses synchronously therefrom, e.g., from the vertical sync pulses, or, if desired, the vertical or horizontal sync pulses could be utilized to synchronize an otherwise free running oscillator.

The recovered signal available from the pickup circuitry 11 is also applied to the sound carrier band-pass filter 19, which extracts the FM sound carrier, the carrier then being demodulated to baseband audio in demodulator 18. Baseband audio and video signals are applied to transmitter 17 which forms a suitable signal for delivery to the antenna terminals of a conventional TV receiver 20.

Figure 2:
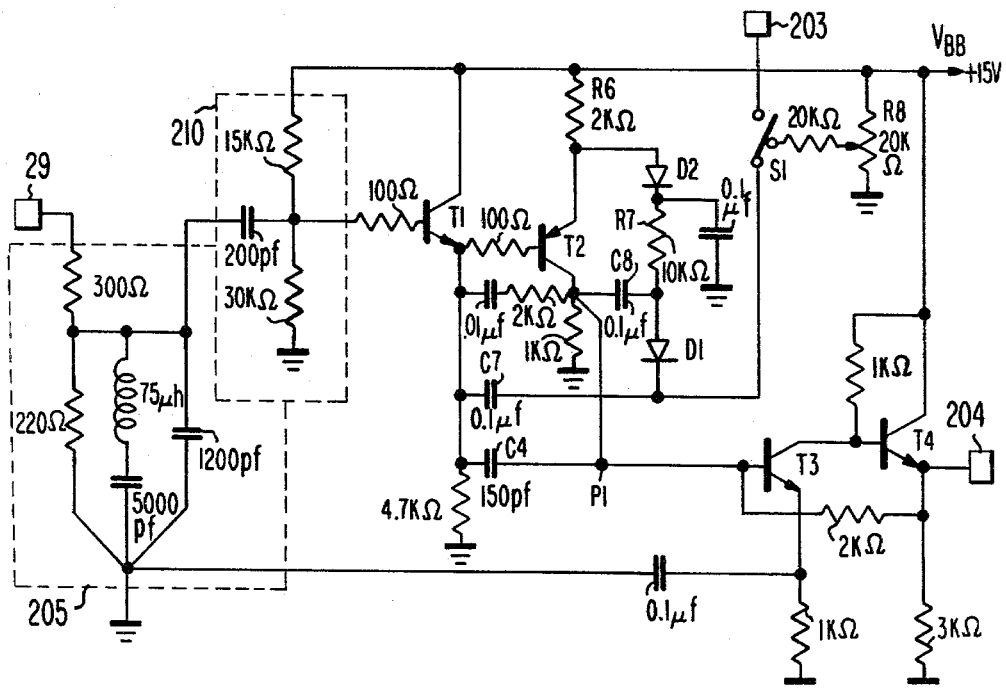
FIG. 2 is a schematic diagram of a non-linear aperture correction circuit.

The non-linear aperture corrector of FIG. 2 affects substantial removal of non-linear distortions such as those manifested as sound carrier interference in the video output display. The intermodulation distortion appears in the composite recovered signal as undesirable sidebands to the picture FM carrier, which sidebands contain sound carrier information. The NLAC circuit generates signals similar to the undesirable sidebands but 180 degrees out of phase thereto and adds these generated signals to the composite signal to effect a cancellation of the undesirable sidebands.

The input section 205 to the circuit peaks the sound carrier with respect to the picture carrier and imparts a 90 degree phase shift to the picture carrier. The circuitry 210 high pass filters the composite signal to reject electrical noise below the sound carrier spectral bands. Transistor T1 operating as an emitter-follower buffers the peaked and filtered signal, making it available at its emitter electrode with low source impedance.

The signal is applied via capacitor C7 to diode D1 which operates as a modulator whereby the sound carrier modulates the picture carrier to produce sidebands to the picture carrier similar to the undesired distortion sidebands generated by the signal recovery apparatus but 180 degrees out of phase therewith. The modulated signal is applied via capacitor C8 to the collector electrode of transistor T2. Transistor T2 having a composite signal applied to its base electrode and having a non-linear emitter load resistance by virtue of diode D2 generates a signal at its collector which when combined with the modulated signal from diode D1 results in a further signal containing modulation products but with the carriers suppressed. This further signal is applied to node P1. The recovered signal available at the emitter electrode of transistor T1 and containing the undesired distortion sidebands is combined with the further signal at node P1 via capacitor C4, tending to cancel the undesired components. The resultant signal is amplified by transistors T3 and T4 and made available at output terminal 204 of the NLAC circuit. Terminal 204 is connected to the picture filter circuit 16.

The amplitude of the modulated signals generated by diodes D1 and D2 is dependent upon the dc bias current conducted in the diodes. If the bias current is too low in amplitude, the modulation products generated by the diodes will be insufficient to cancel the distortion signal in the video signal, and such distortion signal will appear in baseband video at a relative phase angle of zero degrees. Alternatively, if the bias current is too large in amplitude, the modulation products generated by the diodes will be in excess of the amount required to cancel the distortion signal and the excess of the modulation signal will appear in baseband video at a phase angle of 180 degrees relative to the distortion signal. See FIG. 3 for the relative distortion level versus diode bias current.

The diode bias current, is established by the potentiometer R8, i.e., with switch S1 connecting R8 to the cathode of diode D1, dc current flows successively through resistor R6, diode D2, resistor R7, diode D1, through switch S1 and finally through potentiometer R8. However, it should be recognized that different disc record-stylus combinations will produce different levels of distortion components in the recovered signal requiring different amplitude cancellation signals from the diode circuit. It is therefore advantageous to apply an adaptive bias level to the diodes, which adaptive bias current may be applied to terminal 203. (With an adaptive bias current applied to terminal 203 switch S1 would be arranged to connect terminal 203 to the cathode of diode D1.)

An adaptive bias current for the NLAC circuit may be accomplished in a feed forward configuration wherein the bias amplitude is adjusted in accordance with the amplitude of the distortion components of the recovered signal at the output terminal of the pickup circuit 11. This mode of operation is subject to the errors attendant the parameter drift of nominal circuit elements. A feed-back bias generation circuit, on the other hand, measures the amplitude of the resultant distortion after correction to generate the requisite bias current to further reduce the distortion and thereby effect self compensation for the parameter drift of the circuit elements. The present invention utilizes this latter technique.

Referring to the FIG. 4 circuit for generating the NLAC bias current, composite baseband video is applied to terminal 40 for determining the amplitude of the undesired distortion contained in the signal. The baseband video signal applied may be the composite video, the luminance, or the chrominance and vertical detail signal (see the dashed line 26 in FIG. 1) as each contains the undesired distortion signal. However, the chrominance and vertical detail signal contains fewer picture signal components in the spectral band containing the distortion signal and is therefor the preferred signal for accurately measuring the amplitude of the undesired distortion. Band-pass filter 41 having a filter response centered at 716 KH$_z$ for a system having a 716 KH$_z$ sound carrier selectively passes the distortion signal to circuit 42 which amplifies this signal to increase system sensitivity. The amplified distortion signal is then applied to the amplitude or envelope detector 43 which converts the FM distortion to a substantially dc value proportional to the amplitude of the distortion. This dc signal is applied to the comparator circuit 50 which takes successive pairs of samples of the detected distortion signal and depending on whether the first sample of the pair is higher or lower than the second sample, outputs a high or a low potential respectively. The comparator output potential is integrated by circuitry 47 to produce a generally increasing or decreasing potential which is applied to a first input terminal 58 of the adder circuit 48. Simultaneously, an oscillatory signal, V59, synchronized with the comparator sampling is applied to a second input terminal 59 of adder 48. The output signal, V46, at terminal 46 from adder 48 is the linear sum of the integrated comparator output potential and the oscillating signal.

Signals for controlling the sampling performed by the comparator 50 are derived either from free running oscillator 53 or from the baseband video signal. If composite video is applied to input terminal 40, the filter 41 will pass picture information falling in the spectral band of the distortion signal. This picture information will tend to introduce errors into the NLAC bias current available at output terminal 46. During the vertical blanking intervals, however, there is no picture information; hence, if the distortion signal is sampled during this period, the distortion samples tend to be relatively more accurately related to the distortion components. The system may be synchronized to sample during the vertical blanking intervals by deriving the sampling signals directly from the sync pulses in the video signal. To facilitate such synchronization, circuit 52 is included to extract the vertical blanking pulses from the composite video which is applied to terminal 54, and to generate the desired sampling intervals therefrom. Either the synchronized signals from circuit 52 or the free running oscillations from circuit 53 are selectively applied to comparator 50 via switch means S5. Note a third alternative is to synchronize the oscillator 53 with signal derived from circuit 52.

Figure 3:
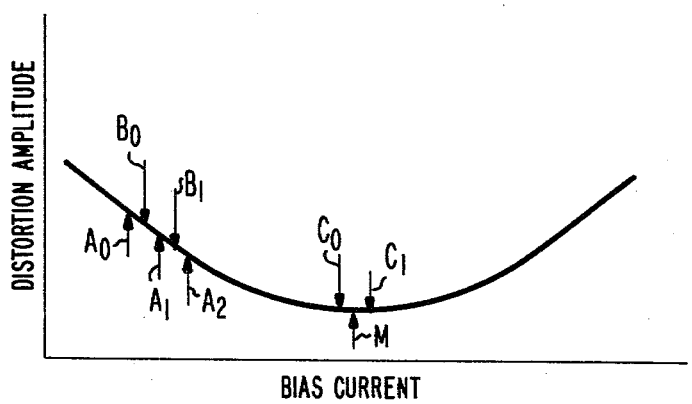
FIG. 3 is a graphical representation of the response of the non-linear correction circuit with respect to applied bias current.
Figure 5:
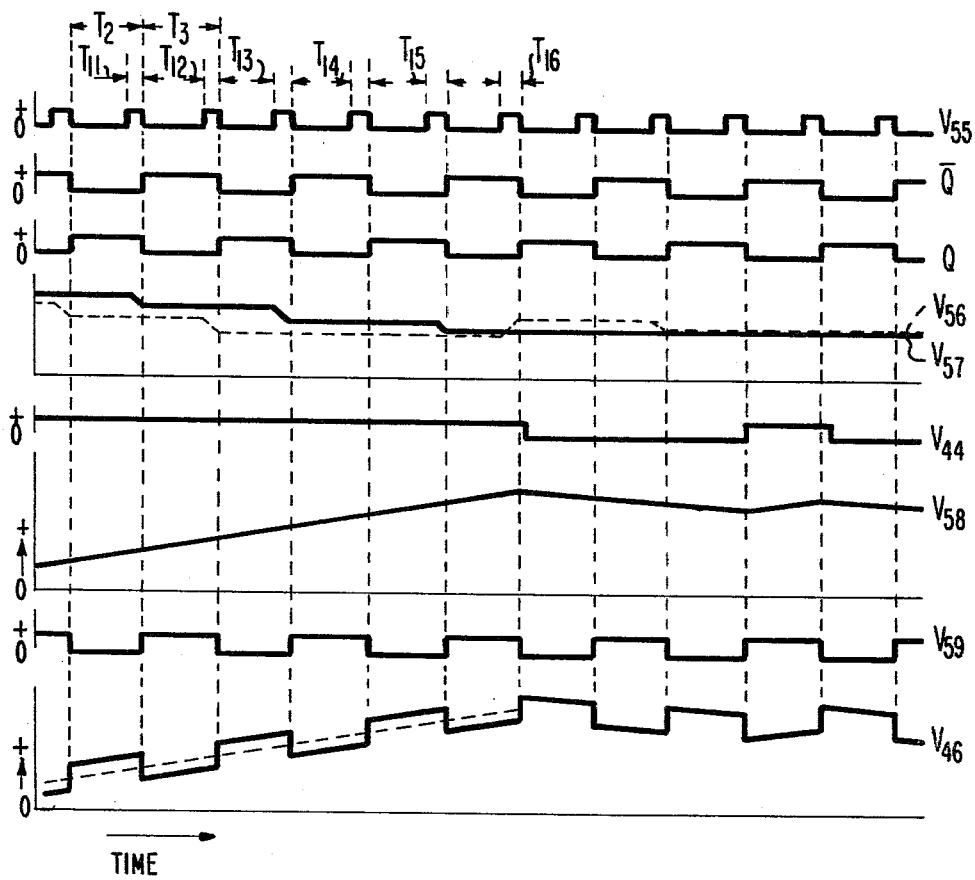
FIG. 5 is a graphical representation of the potential amplitude versus time for several nodes in the FIG. 4 circuit.

The FIG. 4 circuitry will be more fully explained with the aid of FIG. 5 and FIG. 3. Detector 43 is a combination of an envelope detector comprising the base-emitter junction of transistor T5 and resistor-capacitor combination R10, C10 respectively, and a negative peak detector comprising diode D3 and resistor-capacitor combination R11, C11. The envelope detector follows the positive peaks of the signal applied at the base electrode of transistor T5, the potential of the peaks being maintained at the emitter electrode of transistor T5 by capacitor C10. Typically the signal applied at the base electrode of transistor T5 due to imperfect band-pass filtering will contain components of the horizontal sync pulses. Those pulses are included in the envelope detected and occur as positive peaks in the detected signal. To eliminate the influence of these peaks, the envelope is negative peak detected with reference to a positive supply potential, V+, to produce a substantially dc signal potential proportional to the amplitude of the envelope occurring between the horizontal sync pulses. This potential is available at terminal 60.

The potential at terminal 60 is selectively applied via switch S2 and switch S4 or switch S3 to the non-inverting input terminal 57 or the inverting input terminal 56 respectively of amplifier 44. Between samples the potential applied to terminals 56 and 57 are temporarily stored on capacitors C13 and C14, respectively, e.g., capacitor C14 retains the previously applied potential to terminal 57 when switch S4 is open. The timing of the sampling is illustrated in FIG. 5. A repetitive pulse or oscillation is applied to the monostable multivibrator 51 which generates a pulse train, V55 in FIG. 5, each pulse being of prescribed duration and synchronous with the oscillation. This pulse train, available on connection 55, closes switch S2 during the intervals denoted T11, T12, etc. applying the potential at terminal 60 to terminal 70. Simultaneously, the pulse is applied to flip flop 49 which is triggered to change state on the negative going edge of the applied pulse. On successive pulses of the pulse train V55, the Q and the $\overline{Q}$ outputs of the flip flop are alternately "high" (here a "high" output, for illustrative purposes will close the respective switch, i.e., turn the particular switching transistor on). For example, during time T2, Q is high, closing switch S3 and $\overline{Q}$ is low holding switch S4 open. At time T11 when switches S2 and S3 are simultaneously closed the potential at terminal 60 is applied to terminal 56 and capacitor C13. The trailing edge of the T11 pulse triggers a change of state of flip flop 49 causing $\overline{Q}$ to go to a high state closing switch S4 and Q goes to a low state opening switch S3. Subsequently during time T12 switches S2 and S4 are concurrently closed applying the potential at terminal 60 to input terminal 57 and capacitor C14. Typically the switching pulses, V55 are less than 50 percent duty cycle and the Q and $\overline{Q}$ switching pulses are 50 percent duty cycle and complementary to each other.

Immediately after the period T11; if the amplitude of the potential at terminal 57 exceeds the amplitude of the potential at terminal 56, the output potential of amplifier (comparator) 44 will be a high or saturation level indicated as V44 in FIG. 5. The output potential V44 is integrated by capacitor C12 to produce a generally increasing potential, V58, at terminal 58, which in turn is translated to a generally increasing or ramped current waveform at terminal 46 and applied to bias the NLAC circuit. But consider the NLAC response curve of FIG. 3. Assume that at times T12, T13, and T14, the distortion signal corresponds to points denoted $A_0$, $A_1$, and $A_2$ respectively. The decrease in distortion as indicated would correspond to a generally monotonic increase in bias current. Note however that potentials corresponding to levels $A_0$ and $A_1$ would be respectively applied to terminals 57 and 56 during intervals T12 and T13 and the output of amplifier 44 would remain high with a concomitant increase in bias current. But at time T14 a potential corresponding to point $A_2$ would then be applied to terminal 57, which potential is less than the potential currently being stored at terminal 56 causing amplifier 44 to change to a low output state and thereby decrease the NLAC bias current with a resulting shift in distortion level toward point $A_1$ and possibly preventing the system from acquiring a more desirable operating condition between the points designated $C_0$, $C_1$.

In order to preclude the amplifier from undesirably changing state before the system has obtained a near optimum operating condition, the output bias current is forced to oscillate about a value corresponding to the foregoing ramped current. One such current is the ramped square wave indicated as V46 in FIG. 5. This signal is obtained by applying a portion of the $\overline{Q}$ switching potential to terminal 59 with the differential nature of amplifier 45 then algebraically adding this signal to the ramped potential at terminal 58.

Referring again to FIG. 3 and assuming that the bias current to the NLAC circuit resembles the waveform V46 and further that the distortion levels at times T12, T13, T14, and T15 correspond respectively to the distortion amplitudes $A_0$, $A_1$, $B_0$, and $B_1$, it will be demonstrated that the amplifier (comparator) does not change state as the system progresses toward operation at the distortion minimum, M. During period T12, $\overline{Q}$ is high so that switches S2 and S4 are both closed applying the distortion signal corresponding to point $A_0$ to the non-inverting comparator input terminal 57. The bias current that is applied during this period has undergone a small negative decrement as seen in waveform V46 through it is generally increasing. The negative bias current decrement causes the system to operate at a point higher on the FIG. 3 than would be the case if the decrement had not been applied to the generally increasing bias current. Subsequent to the T12 period the switch S4 opens storing the sampled potential on capacitor C14, and the NLAC bias current undergoes a small positive increment tending to force operation farther to the right along the distortion-current curve than would have occurred merely from the generally increasing bias current. At time T13 switches S2 and S3 are both closed and the potential corresponding to the distortion level $A_1$ is applied to inverting input terminal 56. This potential is less than the potential concurrently stored at terminal 57 resulting in comparator 44 producing a "high" level output potential. Subsequent to period T13 the bias current is again decremented such that the system operating point is translated leftward along the distortion-current curve to point $B_0$. Then at time T14 when the sampled input potential is again applied to the non-inverting input terminal 57, the input potential has increased above the last most sample terminal is greater than the potential concurrently stored at the inverting terminal. In contrary fashion during the next succeeding sample, T15, the bias current has again been slightly incremented causing the system to operate at point $B_1$, wherein the corresponding sampled potential is less than the potential $B_0$ and less than the potential corresponding to point $A_1$. This potential is applied to the inverting input terminal 56, and being less than the potential concurrently stored at terminal 57 maintains the comparator output signal in the "high" state. By causing the bias current to alternately increment and decrement by a small amount while the average value of bias current maintains a generally increasing characteristic, the system operating point translates along the distortion-current curve because the first sample in a pair of samples is greater in value than the second sample of such pair, and greater in value than the first sample of the next successive pair of samples, but the second sample of the first set of samples is less than, the value of the first sample of the second set of samples. The average value of the bias current continues to increase in this mode until the system operating point approaches the distortion minimum, M, between points $C_0$, $C_1$. (Note in FIG. 5 the waveforms V56 and V57 represent the sampled potentials at terminals 56 and 57 respectively.)

In a similar fashion if the system is operating along the distortion curve to the right of the minimum, slightly incrementing and decrementing a generally decreasing bias current will translate the system operating point leftward along the distortion-current curve by maintaining the comparator output potential in a "low" state.

Once the system is operating near the distortion minimum, a decrement in the average bias current preceeding the sampling interval will shift operation leftward toward $C_0$ along the curve to increase the distortion potential. The subsequent increment in the average bias current preceeding the next sampling interval will shift the operating point rightward toward $C_1$. Depending on whether the average bias current is to the right or left of point M will determine whether point $C_0$ or $C_1$ represents the greater distortion amplitude. If $C_1$ is greater than $C_0$ the comparator will exhibit a "low" decreasing the bias current and shifting the operating point to the left of point M. On the next successive pair of samples the point $C_0$ would tend to be greater than $C_1$ causing the comparator to exhibit a high output potential resulting in a righthand shift in operating point and the system would continue to iterate back and forth about the distortion minimum.

In FIG. 5, the sampling periods $T_{ii}$ occur at the end of the periods wherein the average bias current has undergone a small increment or decrement. Sampling is performed at this point to allow the system to more nearly settle from the effects of such increment or decrement. The waveform V59 is illustrated as a square wave but the oscillating signal applied to increment and decrement the bias current may be sinusoidal or some other waveshape.

FIG. 6 illustrates an alternate circuit for generating a dithering bias current proportional to the amplitude of the undesired distortion component of signal contained in the baseband video signal. In this configuration baseband video or the chroma and vertical detail components thereof is applied at terminal 75. This signal is filtered to extract the distortion component which is subsequently amplified by amplifier 62 and envelope detected in circuit 63. The envelope of the detected signal is low-pass filtered in circuit 64 and applied to a synchronous detector or multiplier circuit 65. A second or reference signal is applied to the synchronous detector via connection 75, which reference signal is generated in oscillator 72 or produced from the video sync signals by the circuit 76 which strips and conditions the vertical or horizontal sync pulses in the video signal applied to terminal 75. These conditioned pulses are divided down to produce the desired frequency by circuitry 71. Circuitry 71 further conditions the signal to the appropriate amplitude and waveform, e.g., square wave, sinusoidal wave, etc. Selection of a signal from circuitry 71 or oscillator 72 for application as a reference signal to synchronous detector 65 is performed via the switch S5. (Practically, a given system would incorporate only one of the reference signal generating means, the other is included in the drawing for completeness.)

The low-pass filter 64 is arranged to pass frequencies in the spectral band at least up to and including the frequency of the reference signal. The synchronous detector 65 will produce an output signal at terminal 77 proportional to the amplitude of the components of the signal applied to its input terminal 78 which are correlated with the reference signal applied via connection 73.

The output potential from detector 65 is filtered in low-pass filter 66 to produce a generally dc potential at terminal 79 which is proportional to the amplitude of the distortion-components of the video signal. A portion of the reference signal applied via attenuator 74 is superimposed on this generally dc potential in adder 67 to produce a signal at terminal 80 which undergoes a small oscillation. The potential at terminal 80 is converted to a bias current which is available at terminal 69 for application to, e.g., an NLAC circuit.

The operation of the FIG. 6 circuit is very similar to the operation of the FIG. 4 circuit. Circuits 61, 62, and 63 in FIG. 5 are similar to circuits 41, 42, and 43 of FIG. 4. Low-pass filter 64 performs a function similar to switch S2; synchronous detector 65 performs a function similar to comparator 50; low-pass filter 66 operates similar to integrator 47; and attenuator 74 plus adder 67 perform a function similar to adder 48.

The synchronous detector 65 which may be a doubly balanced product detector such as the RCA Corporation CA 2111 integrated circuit (and see U.S. Pat. No. 3,548,326 issued Dec. 15, 1970 to A. Bilotti entitled "Direct Coupled Limiter-Discriminator Circuit"), provides an output potential at terminal 77 proportional to the amplitude of signals applied to input terminal 78 which are correlated (of the same frequency) to the reference signal applied to connection 73. The output potential at terminal 77 linearly increases from a reference level, proportional to the amplitude of the input signal when the input and reference signals are in phase. The output potential linearly decreases from the reference level proportional to the amplitude of the input signal when the input and reference signals are 180 degrees out of phase. Since the bias current applied to the NLAC or compensation circuit is modulated by the reference frequency applied to the synchronous detector 65, the amplitude of the distortion-components will increase and decrease in conformance with the instantaneous value of the reference signal. Due to the shape of the distortion-current curve (FIG. 3) the distortion amplitude is larger during the negative half cycle of the modulating bias current for the system operating to the left of the minimum and larger during the positive half cycle of the modulating bias current for the system operating to the right of the minimum. As a result the synchronous detector output signal will proportionately decrease from its nominal or reference level as the system operates farther to the left on the response curve and will proportionately increase from its nominal or reference level as the system operates farther to the right on the curve. The synchronous detector output signal is inverted by inverting amplifier 81 so that an increase in detector output potential will cause a decrease in potential at terminal 80 and vice versa. The system operation will then tend to move along the distortion curve until it reachs the minimum at which point the distortion produced by both the negative and positive half cycles of the modulating bias current will be substantially equal thereby stabilizing the detector output potential at a point corresponding to a bias current value for the system operating near the distortion minimum. It should be noted that amplifier 81 may in fact be subsumed in the synchronous detector 65, the low-pass filter 66 or the adder 67. Alternatively, if the phase of the modulating signal applied to adder 67 is 180 degrees out of phase with the reference signal at connection 73 the signal inversion produced by inverting amplifier 81 is unnecessary.

Low-pass filter 66 has a cut-off frequency less than the reference frequency, to preclude the bias potential generated by detector 65 from competing with the reference signal added to the signal by adder circuit 67. It is desirable that filter 66 pass only low frequency components, e.g., less than several Hz, so that the system response is relatively long term, preventing the possibility of introducing objectionable visual response due to rapid changes of NLAC bias.

What is claimed is:

1. A disc record player comprising:
   means for recovering modulated information signals including video signals and intermodulation distortion components from a disc record;
   a non-linear compensating means responsive to a bias signal for reducing said intermodulation distortion signal components in the recovered signal;
   signal summing means having an output terminal connected for applying said bias signal to said compensating means, said summing means having a first input terminal connected for receiving a reference signal, and having a second input terminal; and
   further means responsive to said intermodulation distortion components for generating a control signal at an output terminal thereof; and
   means connecting the output terminal of said further means to the second input terminal of said summing means, wherein said bias signal is related to the composite of the control signal and the reference signal and tends to reduce said intermodulation distortion components.

2. In a disc record player for information recovery of video signals including synchronizing pulses and sound signals, an apparatus comprising:
   first means for recovering modulated information signals including video signals from a disc record;
   a non-linear compensation means, coupled to said recovery means and responsive to an applied bias signal for reducing intermodulation distortion components in the recovered signals;
   second means coupled to said compensation means, for demodulating the information signals, said demodulated signals containing said intermodulation-distortion components;
   third means coupled to said second means for generating a further signal related to the amplitude of the intermodulation distortion components in the demodulated signal;
   fourth means coupled to said third means for modulating said further signal with a constant amplitude oscillating signal to provide a modulated bias signal; and
   fifth means coupled to said fourth means for applying the modulated bias signal to the non-linear compensation means.

3. The disc record player as set forth in claim 2 wherein said third means comprises:
   a band-pass filter coupled to said second means for selectively passing the distortion components of the demodulated signal;
   amplitude detection means for detecting the envelope of the signal passed by the band-pass filter;
   comparator means responsive to control signals for successively sampling the envelope of the filtered signal, said comparator means producing at an output terminal thereof a first output potential when the amplitude of the distortion components decreases between prescribed pairs of samples of said envelope, and a second output potential when the amplitude of the distortion components increases between said prescribed pairs of samples of said envelope; and integrator means for averaging the potential at the output terminal of said comparator means, said averaged signal being available at an output terminal of said third means.

4. The disc record player set forth in claim 3 wherein the comparator means comprises;
an amplifier having an inverting input terminal, a non-inverting input terminal and an output terminal;
a first switch means for selectively applying the envelope of the filtered signal to a first circuit node;
a second switch means arranged for selectively connecting said first circuit mode to said non-inverting input terminal; and
a third switch means arranged for selectively connecting said first circuit node to said inverting input terminal wherein said second and third switch means are alternately closed and said first and said second switch means are concurrently closed for prescribed periods and said first and said third switch means are concurrently closed for further prescribed periods.

5. The disc record player set forth in claim 4 further comprising means for generating first, second, and third control signals for opening and closing said first, second, and third switch means respectively, said first control signal being a series of pulses of less than 50 percent duty cycle and occuring at twice the rate of said second and third control signals, said second and third control signals being a series of pulses complementary to each other.

6. The disc record player set forth in claim 5 wherein the control signals are synchronized with the video synchronizing pulses.

7. The disc record player set forth in claim 5 or 6 wherein the constant amplitude oscillating signal for modulating the further signal is a portion of the second control signal.

8. The disc record player set forth in claim 3, 4, 5, or 6 wherein the amplitude detection means comprises:
a transistor having first and second electrodes and a principal conduction path therebetween, a control electrode, the potential applied between said control and said first electrode controlling current conducted by said principal conduction path;
a first resistor connected between said first electrode and a first fixed potential;
a first capacitor connected between said first electrode and one of a first and second fixed potential;
a diode having a cathode connected to said first electrode and an anode connected at an output terminal;
a second resistor connected between said output terminal and said second fixed potential; and
a second capacitor connected between said output terminal and one of said first and second fixed potentials.

9. The disc record player set forth in claim 3, 4, or 5 wherein the integrator means comprises:
a resistor having a first terminal arranged for receiving the comparator output potential and having a second terminal forming the integrator means output terminal; and
a capacitor connected between the second terminal of the resistor and a point of fixed potential.

10. The disc record player set forth in claim 2 wherein the third means comprises:
a band-pass filter coupled to said second means for selectively passing the intermodulation-distortion signal components of the demodulated signal;
amplitude detection means for detecting the envelope of the signal passed by the band-pass filter;
a low-pass filter coupled to said amplitude detection means for rejecting signal frequencies of the detected signal above the frequency of said constant amplitude oscillating signal;
a synchronous detector having first and second input terminals and an output terminal, one of said first and second input terminals being coupled to said low-pass filter, the other of said first and second input terminals arranged to receive said constant amplitude oscillatory signal; and
a further low-pass filter having an input terminal coupled to the output terminal of said synchronous detector, and having an output terminal from which signal from said third means is available, said further low-pass filter having a cut-off frequency less than the frequency of said constant amplitude oscillatory signal.

11. The disc record player set forth in claim 10 including means for generating said constant amplitude oscillating signal.

12. The disc record player set forth in claim 11 wherein the means for generating said constant amplitude oscillating signal comprises a free running oscillator of substantially constant frequency.

13. The disc record player set forth in claim 11 wherein the means for generating said constant amplitude oscillating signal comprises:
means for extracting synchronizing pulses from the recovered video signals; and
means for conditioning said extracted pulses to a desired amplitude, waveform and frequency.

14. The disc record player set forth in claim 2, 3, 4, 5, 6, 10, or 11 wherein the fourth means comprises:
a differential amplifier having an output terminal, a non-inverting input terminal and an inverting input terminal, said non-inverting input terminal being connected to the third means for receiving the further signal;
a first resistor means connected between the output terminal and the inverting input terminal of said differential amplifier; and
a second resistor having a first terminal connected to the differential amplifier inverting input terminal and a second terminal arranged for applying said oscillatory signal thereto.

15. The disc record player set forth in claim 2 or 10 wherein the fifth means is a voltage to current converter.

16. The disc record player set forth in claim 2 or 10 wherein the fifth means is a resistor.

* * * * *

UNITED STATES PATENT AND TRADEMARK OFFICE
CERTIFICATE OF CORRECTION

PATENT NO. : 4,360,829
DATED : November 23, 1982
INVENTOR(S) : George H.N. Riddle It is certified that error appears in the above-identified patent and that said Letters Patent is hereby corrected as shown below:

| | |
|---|---|
| Column 3, line 64 | "a" should be --the--. |
| Column 7, line 17 | "through" should be --though--. |
| Column 7, line 38 | after "sample", insert --so that the potential applied to the non-inverting--. |
| Column 7, line 57 | delete "," after "than". |
| Column 8, line 43 | "75" should be --73--. |

Signed and Sealed this

Eighth Day of February 1983

[SEAL]

Attest:

GERALD J. MOSSINGHOFF

Attesting Officer    Commissioner of Patents and Trademarks